(12) United States Patent
Halleck et al.

(10) Patent No.: US 7,797,463 B2
(45) Date of Patent: Sep. 14, 2010

(54) HARDWARE ASSISTED RECEIVE CHANNEL FRAME HANDLING VIA DATA OFFSET COMPARISON IN SAS SSP WIDE PORT APPLICATIONS

(75) Inventors: William Halleck, Lancaster, MA (US); Pak-lung Seto, Shrewsbury, MA (US); Victor Lau, Marlboro, MA (US); Naichih Chang, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 1286 days.

(21) Appl. No.: 11/170,851

(22) Filed: Jun. 30, 2005

(65) Prior Publication Data

US 2007/0005810 A1 Jan. 4, 2007

(51) Int. Cl.
*G06F 3/00* (2006.01)
*G06F 13/12* (2006.01)
*H04J 3/16* (2006.01)

(52) U.S. Cl. .............................. 710/30; 710/74; 710/36; 710/37; 710/38; 710/52; 370/466; 370/467; 370/469

(58) Field of Classification Search .................... 710/30, 710/36–38, 52, 74; 370/466, 467, 469
See application file for complete search history.

(56) References Cited

U.S. PATENT DOCUMENTS

| | | | |
|---|---|---|---|
| 5,588,000 A * | 12/1996 | Rickard | 370/428 |
| 6,259,699 B1 | 7/2001 | Opalka et al. | |
| 6,359,883 B1 | 3/2002 | Lechleider | |
| 6,839,794 B1 | 1/2005 | Schober | |
| 7,016,304 B2 * | 3/2006 | Chou et al. | 370/235 |
| 7,089,555 B2 * | 8/2006 | Calvignac et al. | 718/100 |
| 7,171,484 B1 * | 1/2007 | Krause et al. | 709/232 |
| 7,197,591 B2 | 3/2007 | Kwa et al. | |
| 7,366,817 B2 | 4/2008 | Chang et al. | |
| 2003/0039250 A1 | 2/2003 | Nichols | |
| 2003/0214949 A1 | 11/2003 | Shaikli | |
| 2004/0083077 A1 | 4/2004 | Baumer et al. | |
| 2006/0031612 A1 | 2/2006 | Bashford et al. | |
| 2006/0039405 A1 * | 2/2006 | Day et al. | 370/469 |
| 2006/0039406 A1 * | 2/2006 | Day et al. | 370/469 |

FOREIGN PATENT DOCUMENTS

WO WO2007002922 1/2007

OTHER PUBLICATIONS

Evans, Mark, "Serial Attached SCSI Architecture: Part 4—The SAS Transport Layer" (MAXTOR Dec. 2003).
Notification of Transmittal of International Preliminary Examination Report, International Application No. PCT/US2006/026104, Nov. 22, 2006.

(Continued)

*Primary Examiner*—Henry W. H. Tsai
*Assistant Examiner*—Eric T Oberly
(74) *Attorney, Agent, or Firm*—Blakely, Sokoloff, Taylor & Zafman LLP (57) ABSTRACT

A device includes a task context controller, at least one transport engine connected to the task context controller, and at least one comparator connected to the transport engine. The comparator to compare a data offset from a receive frame with a current data offset and a result is used to determine frame processing order.

19 Claims, 8 Drawing Sheets

OTHER PUBLICATIONS

Jung, Ray et al., "PMC-Sierra Webinar: Building Storage Systems Using SAS and SATA Technologies", Jun. 2004, 16 pages, PMC-Sierra, Inc.

"American National Standard for Information Technology—Serial Attached SCSI (SAS)", American National Standard, 376, Nov. 11, 2003, 465 pages.

* cited by examiner

HARDWARE ASSISTED RECEIVE CHANNEL FRAME HANDLING VIA DATA OFFSET COMPARISON IN SAS SSP WIDE PORT APPLICATIONS

BACKGROUND

1. Field

The embodiments relate to frame processing optimization, and more particularly to frame processing optimization for wide port devices.

2. Description of the Related Art

The serial attached SCSI (small computer systems interface) (SAS) standard (standard (e.g., Version 1.1, Revision 09d, May 30, 2005; SAS-1.1) specifies two type of frames— interlock and non-interlock frames. It is required that an interlock frame be acknowledged before another frame is sent. For non-interlock frames, the transmitter can send multiple non-interlock frames before getting acknowledgements. Also, acknowledge/non-acknowledge (ACK/NAK) is balanced when the total number of received ACK/NAK is the same as the total transmitted frames. The SAS standard also allows a frame transmitter to switch to another phy within a wide port device (e.g., a four lane port device) to continue sending the remaining frames of the same input/output (I/O) or I_T_L_Q Nexus (SCSI Initiator, SCSI Target, Logical Unit, and Tagged Task) after ACK/NAK became balanced on the original phy in SAS SSP (SAS transport data) wide port configuration.

When multiple frames of the same I/O on different receiving paths are ready for the corresponding receive transport (RX) engines to process, it is very difficult and complex for the RX transport engines to determine the frame processing order across all the lanes within a SAS wide port device. The most commonly used technique is a time stamping method, which can involve complex time stamp searching and comparing among all the lanes within a wide port device configuration. This also requires a lot of communication among those lanes. Note that, it is suggested that all the received frames of the same I/O be processed in order with respect to the relative offset (RO) order in most of the applications. For example of an I/O with starting address 0 and 4 k byte count, it is suggested that the RX transport engines process a frame with relative offset 0 first, relative offset 1 k second, relative offset 2 k third, and relative offset 3 k last assuming that the 4 k I/O is broken up with 1 k which is the maximum frame size in SAS standard.

BRIEF DESCRIPTION OF THE DRAWINGS

The embodiments are illustrated by way of example, and not by way of limitation, in the figures of the accompanying drawings and in which like reference numerals refer to similar elements and in which.

DETAILED DESCRIPTION

The embodiments discussed herein generally relate to frame processing for SAS wide port devices. Referring to the figures, exemplary embodiments will now be described. The exemplary embodiments are provided to illustrate the embodiments and should not be construed as limiting the scope of the embodiments.

Figure 1:
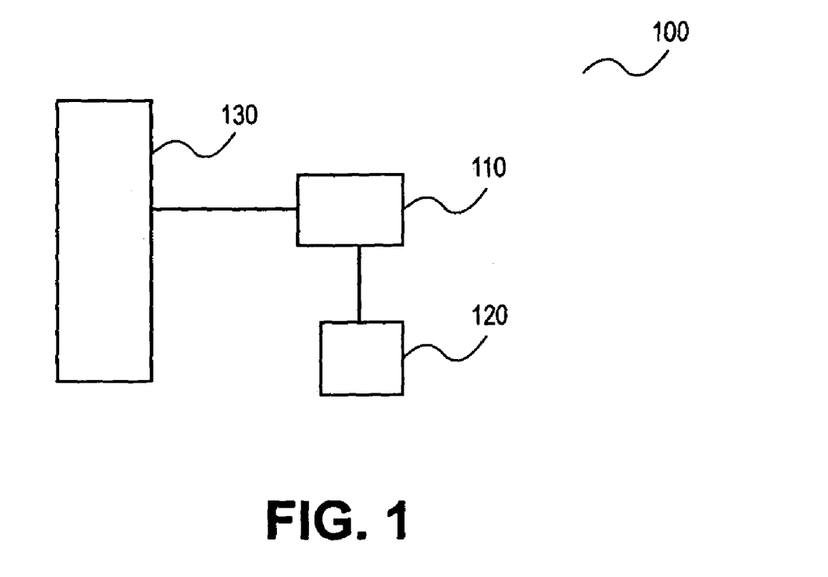
FIG. 1 illustrates an embodiment for optimizing frame processing for wide port devices.

FIG. 1 illustrates an embodiment including task context controller 130, at least one transport engine 110 and at least one comparator 120. In one embodiment comparator 120 receives a data offset value from a receive frame buffer and a current data offset value from the corresponding task context. The comparator then compares the two values. A result of the comparison is then used to determine frame processing order. In one embodiment processing of a frame starts if the data offset value from a receive frame buffer matches a current data offset value from its corresponding task context. In another embodiment if the data offset value from a receive frame buffer is greater than the current data offset value from a task context, a first counter is started and a second counter is incremented. In one embodiment the first counter is an on hold timeout counter and the second counter is a task context access retry counter. In yet another embodiment, if data offset value from a receive frame buffer is less than the current data offset value from its task context, a retry routine may be initiated if transport layer retry (TLR) conditions are met. In still another embodiment, if the data offset value from a receive frame buffer is less than the current data offset value from its task context and the TLR conditions are not met, the error recovery routine may be initiated.

In one embodiment, if the data offset value from a receive frame buffer is greater than the current data offset value a request for processing is declined and a signal to unlock a locked context is transmitted. In another embodiment if the data offset value from a receive frame buffer is less than the current data offset value and TLR conditions are met, a grant signal for a request for processing is transmitted and a retry routine is performed. In yet another embodiment if the data offset value from a receive frame buffer is less than the current data offset value a locked task context is unlocked. In still another embodiment if the data offset value from a receive frame buffer matches the current data offset value a locked task context is unlocked. It should be noted that complete task context accessing can involve other operations besides unlocking and locking.

In one embodiment at least two transport engines 110 are connected to the task context controller. In this embodiment the transport engines each service a lane in a wide port device. In another embodiment at least two comparators 120 are connected to task context controller and storage 130. In this embodiment, each comparator 120 services data for a separate lane in a wide port device.

In one embodiment a frame handling unit (see FIG. 4A-B, frame handling unit 410) is connected to task controller 130. In this embodiment frame handling unit 410 includes task context fetch unit 330 (see FIG. 3A-B, FIG. 4A-B), controller unit 370 (see FIG. 3A-B, FIG. 4A-B) connected to task context fetch unit 330. In this embodiment comparator 210 is disposed within frame handling unit 410.

Figure 2:
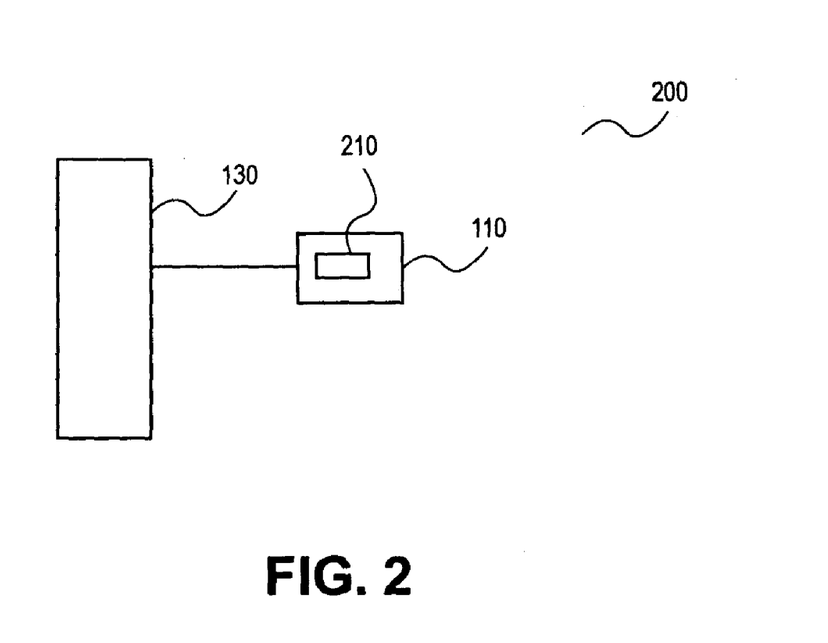
FIG. 2 illustrates another embodiment for optimizing frame processing for wide port devices.

FIG. 2 illustrates an embodiment including task context controller and storage 130, at least one transport engine 110 having at least one comparator 210. Transport engine 110 further includes task context fetch unit 330 (see FIG. 3A-B), on-hold timeout counter 350, task context retry counter 360 and transport engine control unit 370 (see FIG. 3A-B).

Figure 3A:
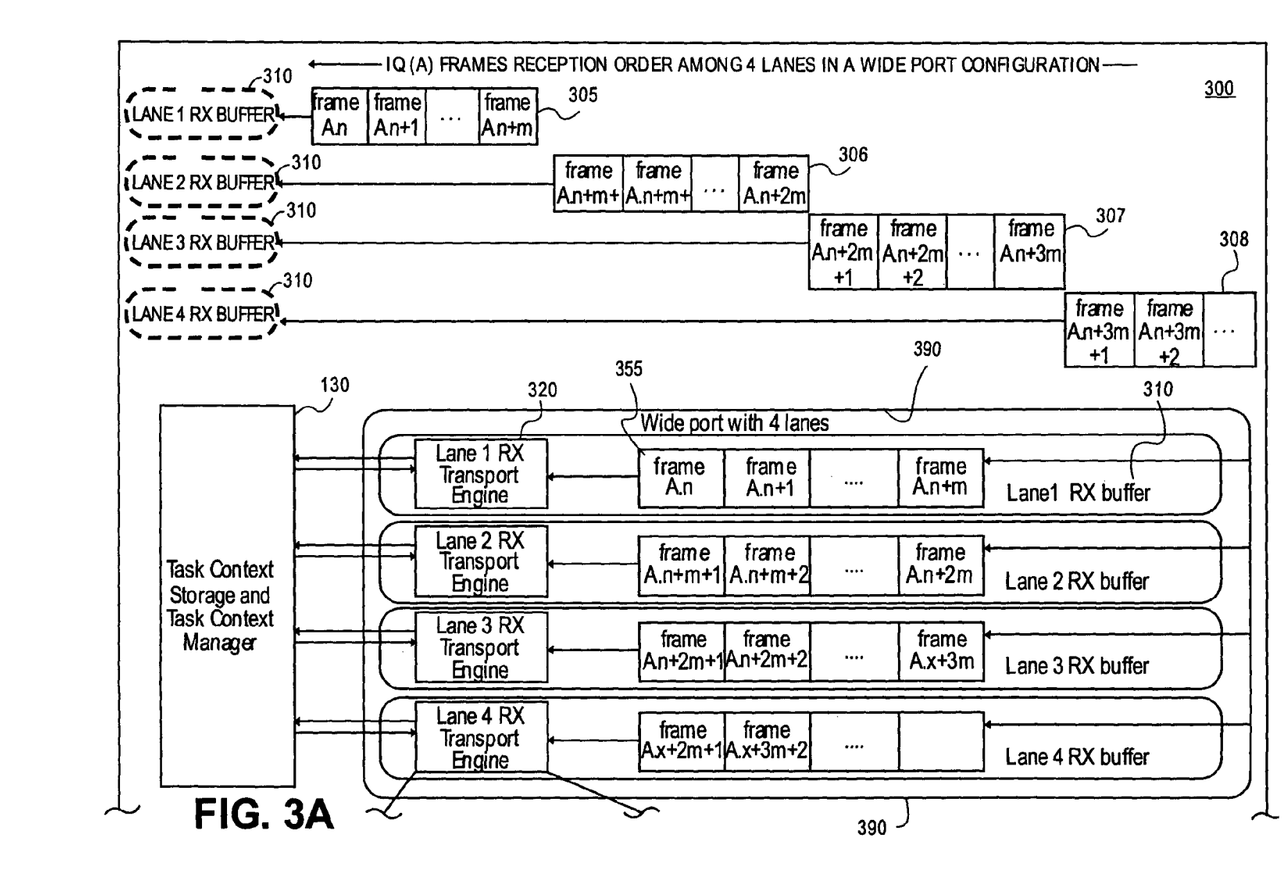
FIG. 3A-B illustrate an embodiment including at least one transport engine having at least one comparator.
Figure 3B:
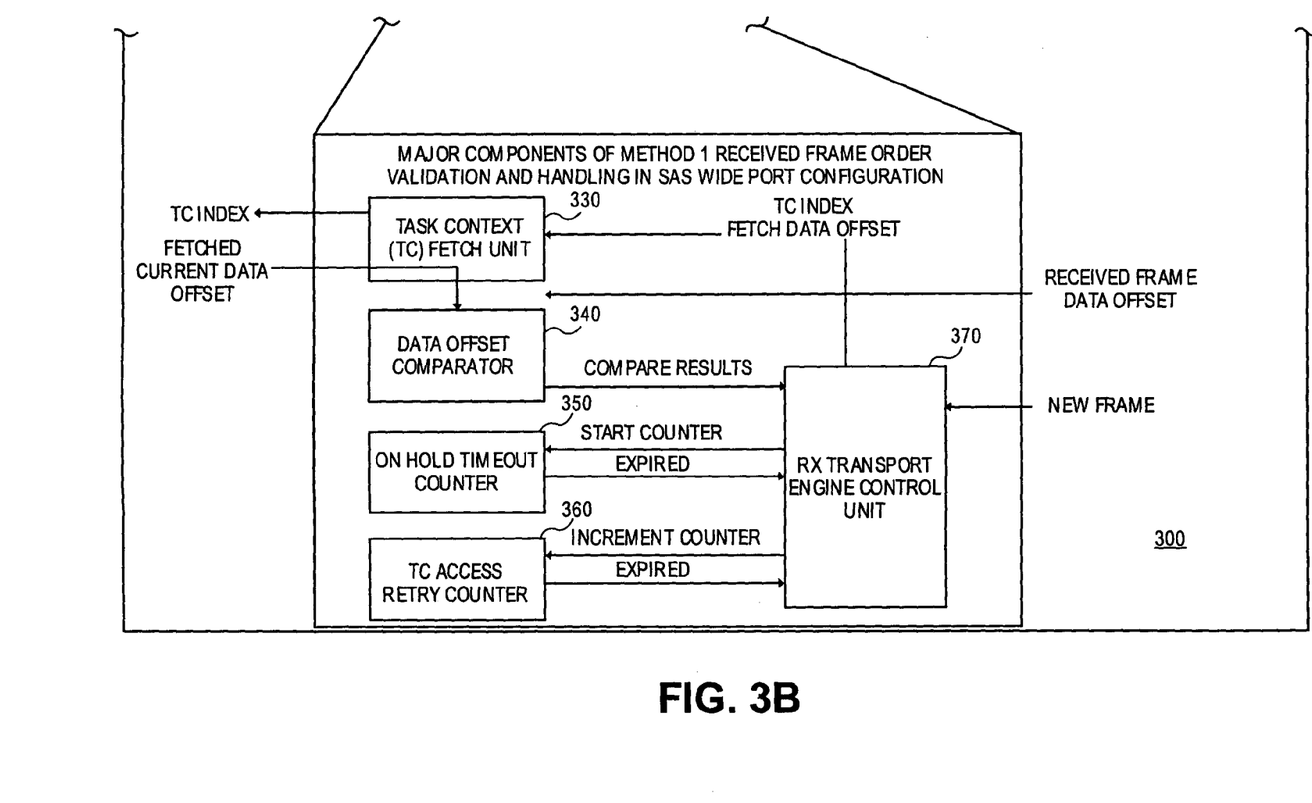

FIG. 3A-B illustrate an embodiment including task context controller and storage 130 connected to wide port device 390, one or more transport engines 320 connected to task context controller and storage 130, one or more comparators 340 included in transport engine(s) 320, task context fetch unit 330 included in transport engine(s) 320, and on-hold timeout counter 350 and task context retry counter 360 each included in transport engine(s) 320, which are included in device 300.

Wide port device 390 includes at least one buffer for each lane. In one embodiment wide port device 390 includes at least two lanes. In one embodiment comparator(s) 340 compare a data offset from receive frame 355 with a current data offset and a result is used to determine frame processing order. In one embodiment comparator 340 receives a data offset value from a receive frame buffer 310 and a current data offset value from a task context. Comparator 340 than compares the two values. A result of the comparison is then used to determine frame processing order. In one embodiment processing of a frame starts if the data offset value from a receive frame buffer matches a current data offset value from a task context. In another embodiment if the data offset value from a receive frame buffer 310 is greater than the current data offset value from a task context, on hold timeout counter 350 is started and task context retry counter 360 is incremented. In yet another embodiment, if data offset value from a receive frame buffer is less than the current data offset value from a task context, a retry routine is initiated if TLR conditions are met. In still another embodiment, if the data offset value from receive frame buffer 310 is less than the current data offset value from a task context, an error recovery routine is initiated if TLR conditions are not met.

In one embodiment, if the data offset value from a receive frame buffer 310 is greater than the current data offset value a request for processing is declined and a signal to unlock a locked context is transmitted. In another embodiment if the data offset value from a receive frame buffer 310 is less than the current data offset value and TLR conditions are met, a grant signal for a request for processing is transmitted and a retry routine is performed. In yet another embodiment if the data offset value from a receive frame buffer 310 is less than the current data offset value a locked task context is unlocked. In still another embodiment if the data offset value from a receive frame buffer 310 matches the current data offset value a locked task context is unlocked.

Figure 4A:
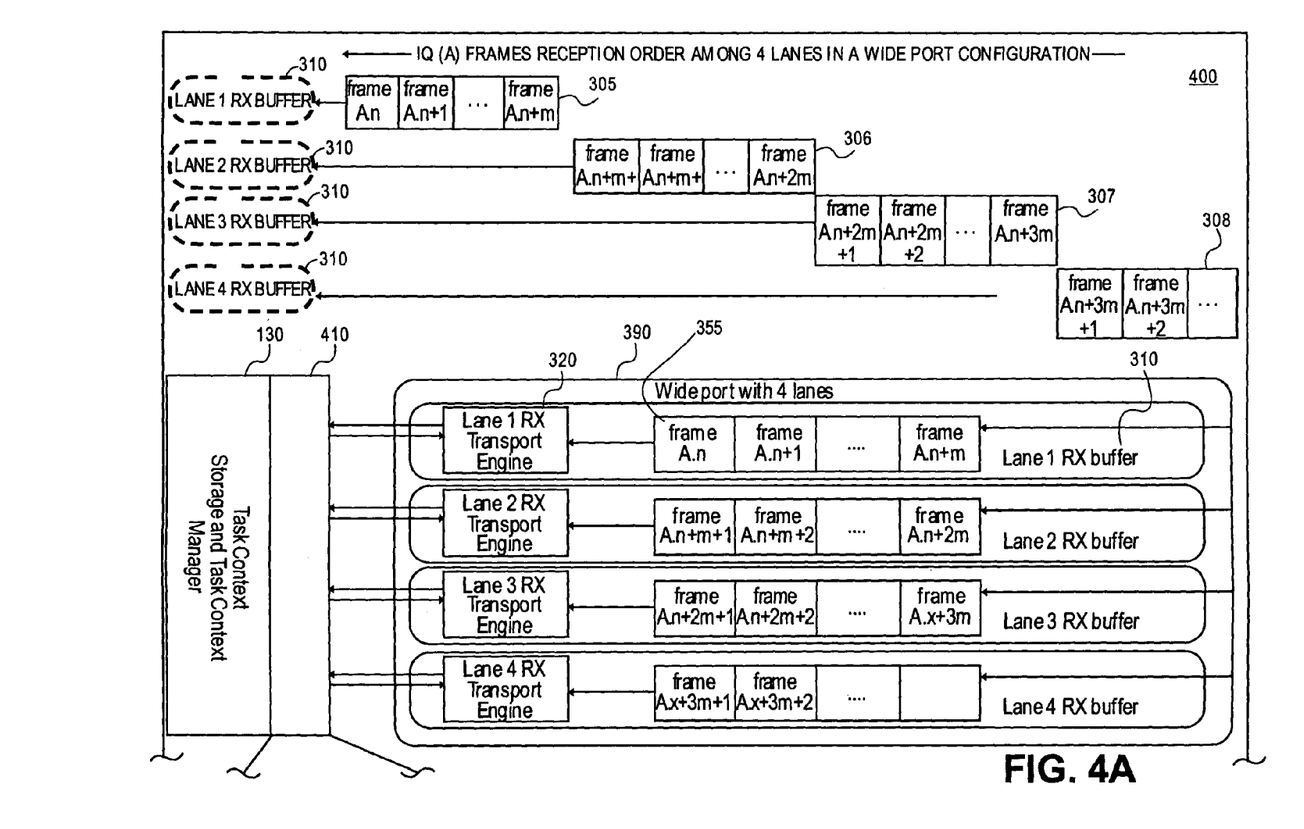
FIG. 4A-B illustrate an embodiment including at least one transport engine and a frame transport unit having at least one comparator.
Figure 4B:
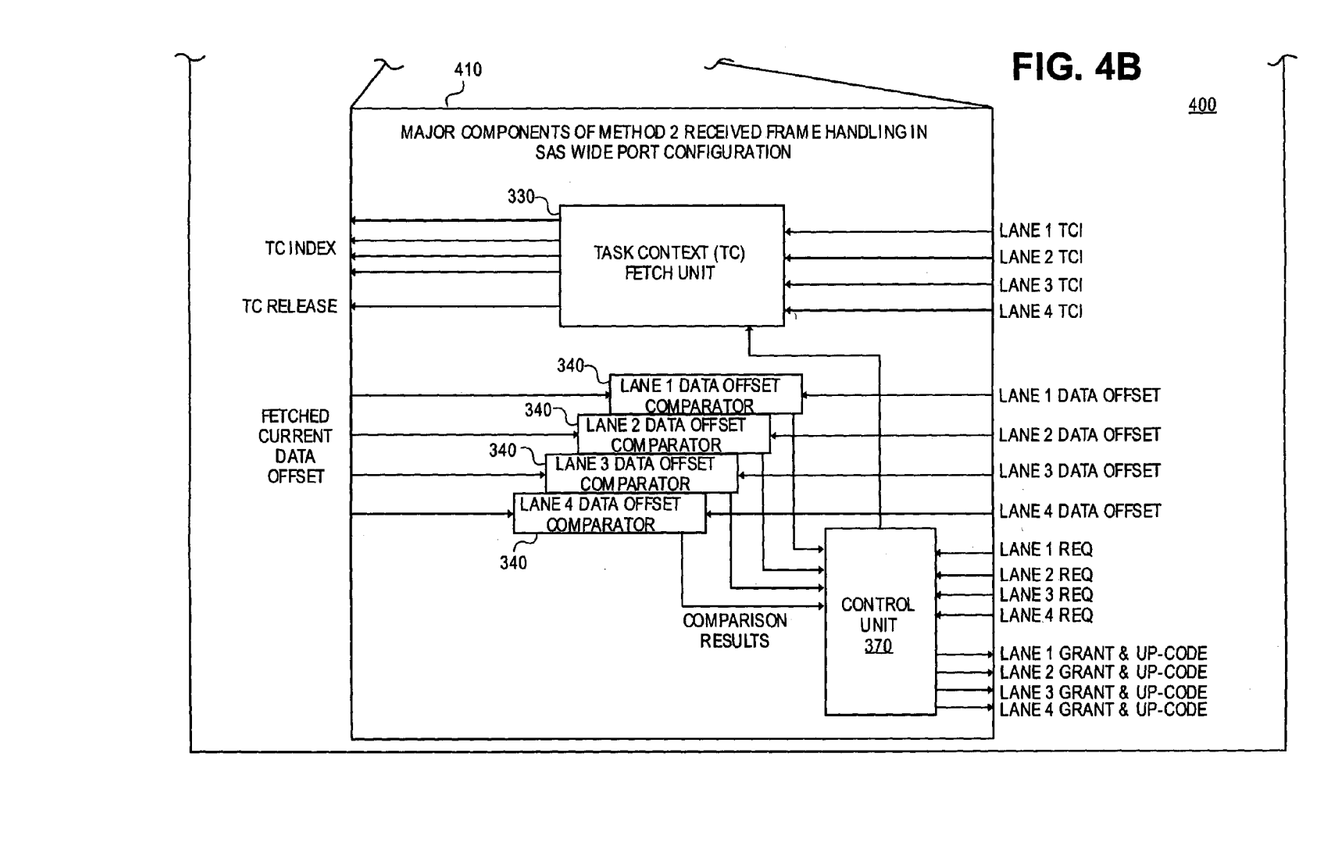

FIG. 4A-B illustrate an embodiment including task context controller and storage 130 connected frame handling unit 410 included in device 400. Wide port device 390 is connected to frame handling unit 410. One or more transport engines 320 are connected to frame handling unit 410. In one embodiment, frame handling unit 410 includes one or more comparators 340, task context fetch unit 330 and control unit 370.

Wide port device 390 may include at least one buffer for each lane. In one embodiment wide port device 390 includes at least two lanes. In one embodiment comparator(s) 340 compare a data offset from receive frame 355 with a current data offset and a result is used to determine frame processing order. In one embodiment comparator 340 receives a data offset value from a receive frame buffer 310 and a current data offset value from a task context. Comparator 340 then compares the two values. A result of the comparison is then used to determine frame processing order. In one embodiment processing of a frame starts if the data offset value from a receive frame buffer matches a current data offset value from a task context. In another embodiment if the data offset value from a receive frame buffer 310 is greater than the current data offset value from a task context, the task context is unlocked and a request service process is run. In yet another embodiment, if data offset value from a receive frame buffer is less than the current data offset value from a task context, retry routine is initiated.

In still another embodiment, if the data offset value from a receive frame buffer 310 is less than the current data offset value from a task context and TLR conditions are not met, error recovery routine is initiated. In one embodiment, if the data offset value from a receive frame buffer 310 is greater than the current data offset value a request for processing is declined and a signal to unlock a locked context is transmitted. In another embodiment if the data offset value from a receive frame buffer 310 is less than the current data offset value and TLR conditions are met, a grant signal for a request for processing is transmitted and retry routine is performed. In yet another embodiment if the data offset value from a receive frame buffer 310 is less than the current data offset value a locked task context is unlocked. In still another embodiment if the data offset value from a receive frame buffer 310 matches the current data offset value a locked task context is unlocked.

Figure 5:
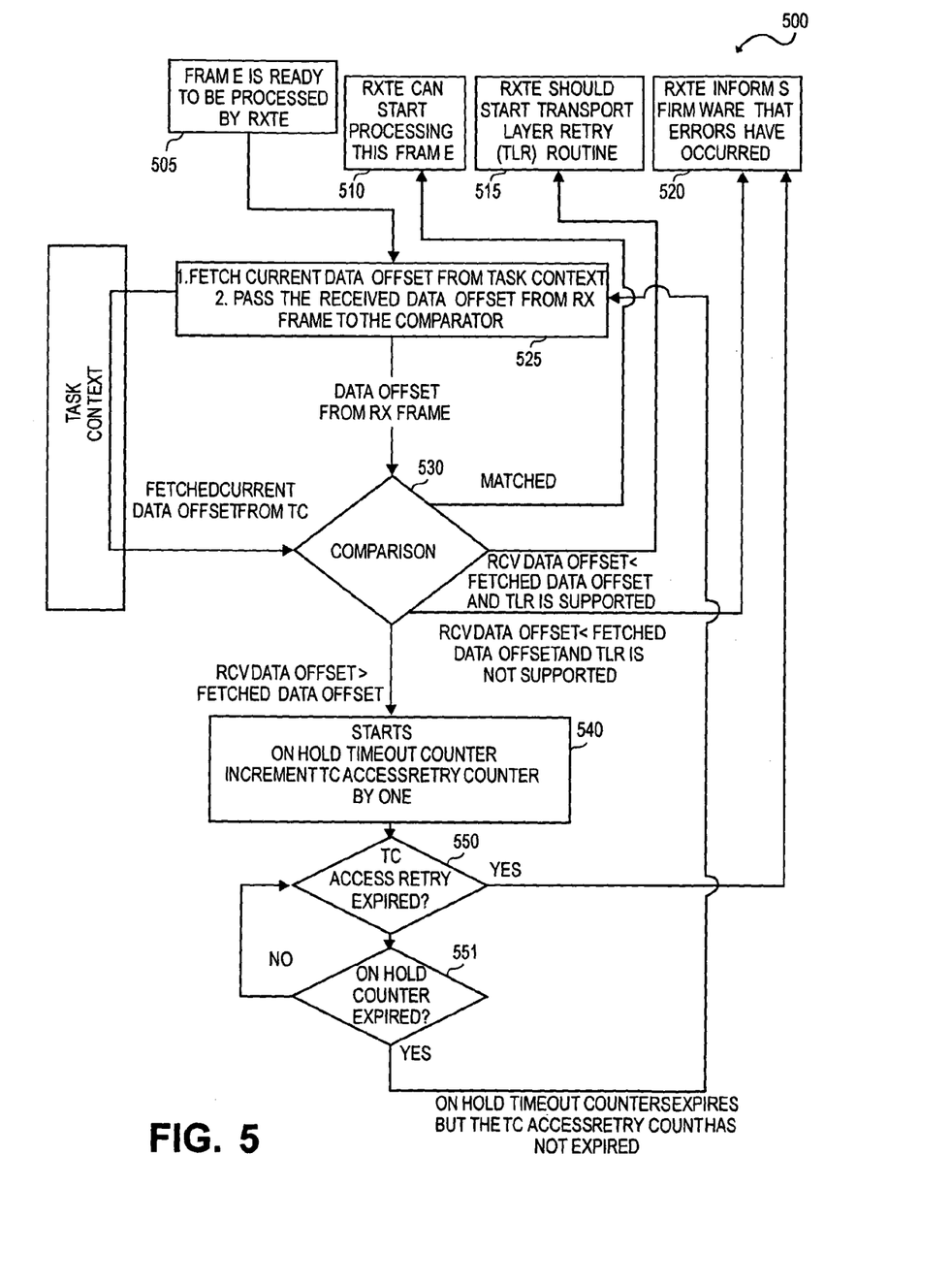
FIG. 5 illustrates a block diagram of a process embodiment.

FIG. 5 illustrates an embodiment including process 500. Process 500 begins with block 505 where a frame is ready to be processed by a receive transport engine (e.g., transport engine 320). Process 500 continues with block 525 where a first data offset value (e.g., current data offset value from task context) is fetched and received by a task context fetch unit (e.g., context fetch unit 330) in a receive transport engine. A second data offset value (e.g., data offset value from receive frame) is then received. The context fetch unit and RX transport engine then send both the first data offset value and the second data offset value to a comparator (e.g., comparator 340). In block 530, the first data offset value and the second data offset value are compared. If block 530 determines that the first data offset value matches the second data offset value, process 500 continues with block 510. In block 510 the receive transport engine begins processing the current frame.

If block 530 determines the second data offset value is less than the first data offset value and TLR conditions are met, process 500 continues with block 515. It should be noted that other embodiments can use other retry logic, such as SCSI modify data pointer. In block 515 a receive transport engine begins processing TLR logic. If block 530 determines the second data offset value is less than the first data offset value and TLR conditions are not met, process 500 continues with block 520. In block 520, the receive transport engine passes error information to a logic device, such as a device with firmware, a logic device, a memory, a processor, etc. In one embodiment the receive transport engine informs the upper layer software to abort the current input/output (I/O) and performs error recovery routine.

If block 530 determines the second data offset value is greater than the first data offset value then process 500 continues with block 540. In block 540 a first counter/timer (e.g., on hold timeout counter 350) is started and a second counter/timer (e.g., task context retry counter 360) is incremented. In one embodiment the second counter/timer is decremented. It should be noted that the first counter/timer and second counter/timer can be implemented to either countdown or count up. Other embodiments can use other timing devices for a timeout or a maximum time limit. Process 500 then continues with block 550. In this embodiment the countdown/count up limit values for the first counter/timer and the second counter/timer are based on the depth of each receive buffer and the direct memory access (DMA) receive data drain rate.

Note that, the first counter/timer can be dynamically adjusted based on the DMA receive data drain rate.

In block 550 it is determined that the second counter/timer has expired (i.e., exceeded a predetermined limit or counted down to zero from a predetermined value) process 500 continues with block 520. If it is determined that the second counter/timer has not expired, process 500 continues with block 551. In block 551, if it is determined that the first counter/timer has expired (but the second counter/timer has not yet expired), process 500 continues with block 525. If it is determined that the first counter/timer has not expired (i.e., neither the first or second counter/timer has expired) process 500 continues with block 550.

Figure 6:
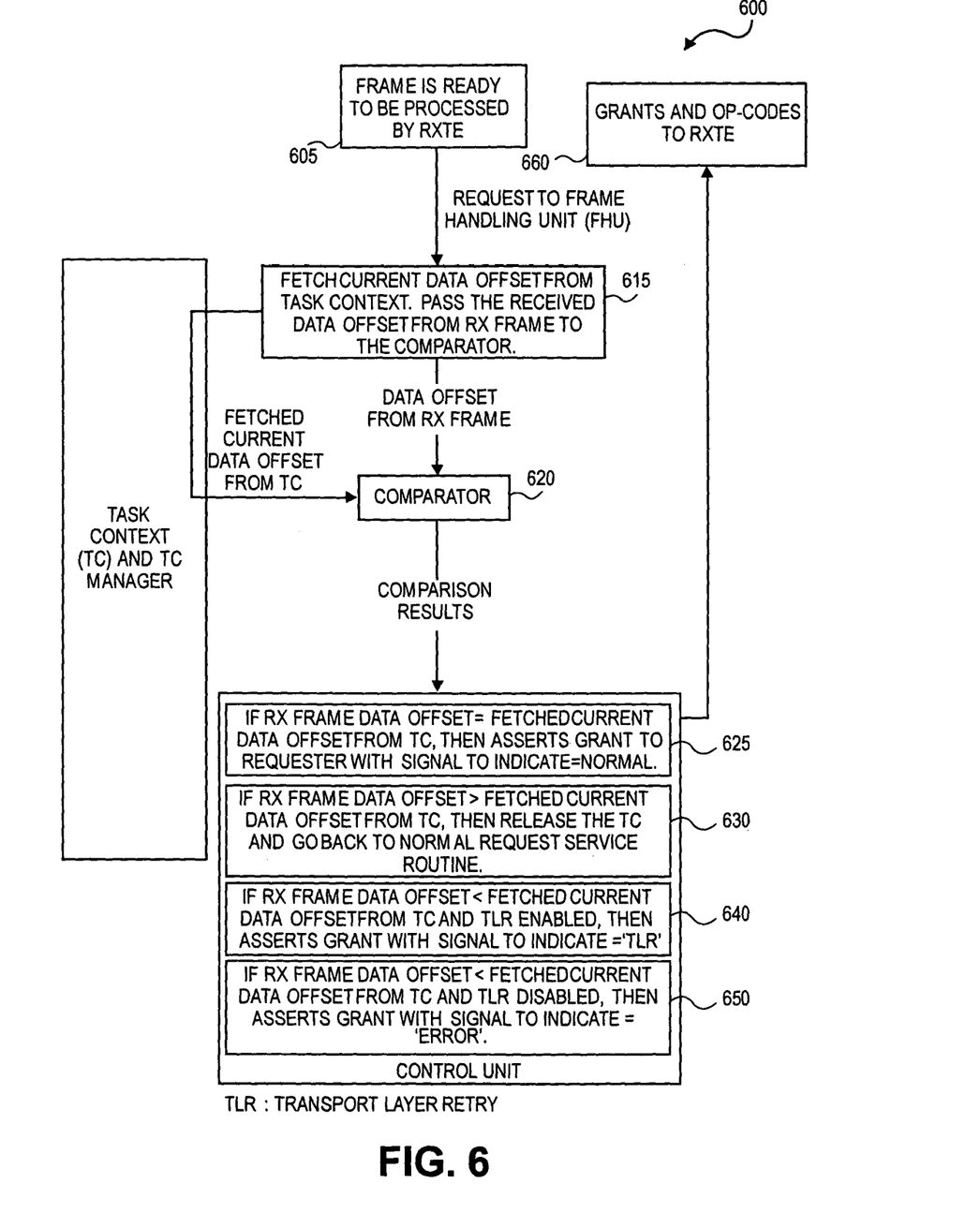
FIG. 6 illustrates a block diagram of a process for another embodiment.

FIG. 6 illustrates an embodiment including process 600. Process 600 begins with block 605 where a frame is ready to be processed by a receive transport engine (e.g., transport engine 320). In one embodiment, when a frame is ready to be processed by a receive transport engine, the receive transport engine requests permission of frame processing by providing the received data offset and task context index (TCI) to the frame handling unit. As illustrated in FIG. 4A-B, each of the 4 lanes has a frame to be processed. All 4 receive transport engines make requests to the frame handling unit.

Process 600 continues with block 615. In block 615 a first data offset value (e.g., current data offset value from task context) is fetched and received by a task context fetch unit (e.g., context fetch unit 330) in a frame handling unit (e.g., frame handling unit 410). A second data offset value (e.g., data offset value from receive frame) is then received. The context fetch unit and the RX transport engine then send the first data offset value and the second data offset value to a comparator (e.g., comparator 340 in frame handling unit 410). In one embodiment the task context fetch unit fetches the current data offset from the task context based on the TCI provided by the receive transport engine and the request from the control unit (e.g., control unit 370). In this embodiment, the current data offsets are returned to the lane data offset comparators (e.g., comparators 340). In one embodiment, once a task context is in use, it is locked by the task context controller (e.g., task context controller 130). In this embodiment, when the next requester with the same TCI (meaning the same I/O) fetches the current data offset from the task context, it will not be granted by the task context controller until the task context is unlocked.

In block 620, the first data offset value and the second data offset value are compared by comparator(s) (e.g., comparators 340). In one embodiment, the results from the comparator(s) are sent to the control unit. Process 600 then continues with block 625. In block 625, if the first data offset value matches the second data offset value, process 600 continues with block 660. In block 660 a grant is asserted for a task context and a signal is transmitted to indicate normal. If block 625 determines that the first data offset value does not match the second data offset value, then process 600 continues with block 630.

In block 630 it is determined if the second data offset value is greater than the first data offset value. If block 630 determines that the second data offset value is greater than the first data offset value then process 600 returns to block 605. In one embodiment, the grant access is held off and lanes 2-4 receive transport engines have to wait. It should be noted that, since the grant is not returned, the request should still be asserted. As long as the request is asserted, the control unit will continue to service the request. If it is determined that the second data offset value is less than the first data offset value, process 600 continues with block 640.

In block 640, it is determined if the second data offset value is less than the first data offset value and if TLR logic is supported. If block 640 determines that the second data offset value is less than the first data offset value and TLR conditions are met, then process 600 asserts a grant for the task context and transmits a signal to indicate TLR. If block 640 determines that the second data offset value is less than the first data offset value and TLR conditions are not met, then process 600 continues with block 650.

In block 650, it is determined (i.e., defaulted) that the second data offset value is less than the first data offset value and TLR conditions are not met. Process 600 asserts a grant for the task context, begins to process TLR logic and transmits a signal to indicate "ERROR." It should be noted that other embodiments can use other retry logic, such as SCSI modify data pointer. It should be noted that frame handling unit passes error information to a logic device, such as a device with firmware, a logic device, a memory, a processor, etc. In one embodiment the frame handling unit informs the upper layer software to abort the current I/O task and performs error recovery logic.

Figure 7:
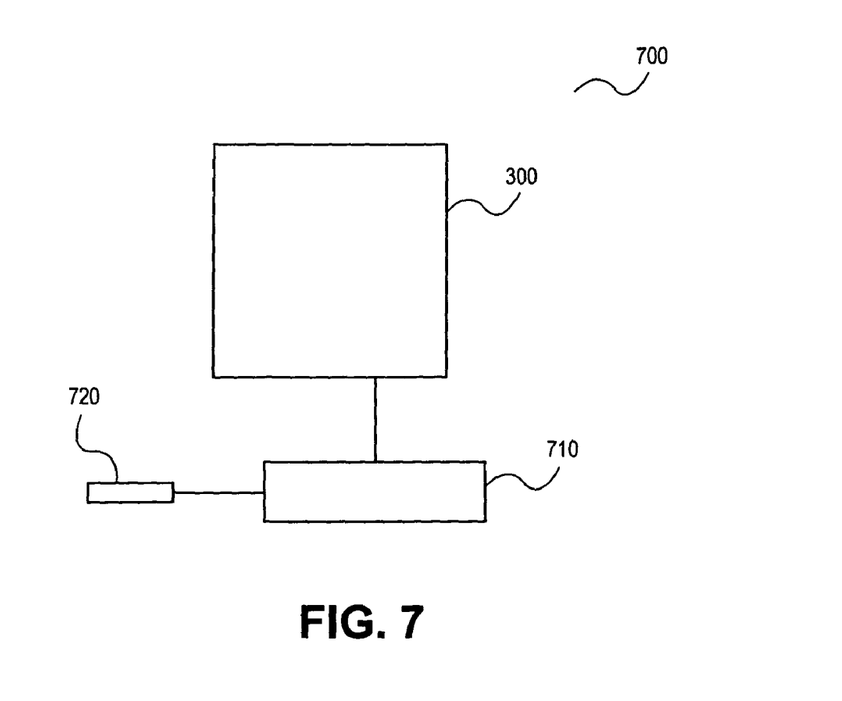
FIG. 7 illustrates a system embodiment.

FIG. 7 illustrates an embodiment including system 700. System 700 includes device 300 and processor 710 connected to main memory 720. In one embodiment, processor 710 is a multiprocessor (e.g., a central processing unit (CPU)). In one embodiment device 300 performs process 500. In one embodiment main memory 720 can be memory devices such as random access memory (RAM), static RAM (SRAM), dynamic RAM (DRAM), synchronous DRAM (SDRAM), read-only memory (ROM), etc. It should be noted that future memory devices may also be used for main memory 720. In one embodiment a display 730 (not illustrated) is connected to processor 710. Display 730 may be a display device such as an active matrix liquid crystal display (LCD), dual-scan super-twist nematic display, etc. Lower cost display panels with reduced resolutions and only monochrome display capabilities can also be included in system 700. One should note that future technology flat screen displays can also be used for display 730. In one embodiment, system 700 is disposed in a computer, such as a desktop computer, a server, a notebook computer, a personal digital assistant (PDA), a cell telephone, a vehicle computer, etc.

Figure 8:
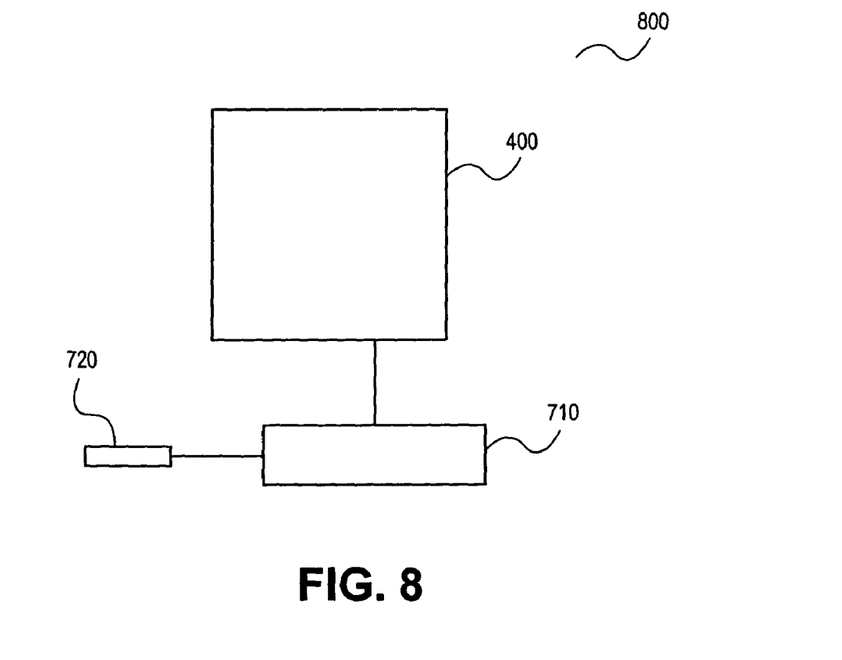
FIG. 8 illustrates a system for another embodiment.

FIG. 8 illustrates an embodiment including system 800. System 800 includes device 400 and processor 710 connected to main memory 720. In one embodiment device 400 performs process 600. In one embodiment a display 730 (not illustrated) is connected to processor 710. In one embodiment, system 800 is disposed in a computer, such as a desktop computer, a server, a notebook computer, a personal digital assistant (PDA), a cell telephone, a vehicle computer, etc.

The embodiments do not require a lot of memory accessing and processor computing to process frames by firmware, which typically result in I/O process performance degradation. By using hardware accelerated techniques and implementations to process frames in receiving channels of SAS wide port configuration, the embodiments eliminate software overhead and improve storage I/O processing performance.

Some embodiments can also be stored on a device or machine-readable medium and be read by a machine to perform instructions. The machine-readable medium includes any mechanism that provides (i.e., stores and/or transmits) information in a form readable by a machine (e.g., a computer, PDA, cellular telephone, etc.). For example, a machine-readable medium includes read-only memory (ROM); random-access memory (RAM); magnetic disk storage media; optical storage media; flash memory devices; biological electrical, mechanical systems; electrical, optical, acoustical or other form of propagated signals (e.g., carrier waves, infrared signals, digital signals, etc.). The device or machine-readable medium may include a micro-electromechanical system (MEMS), nanotechnology devices, organic, holographic, solid-state memory device and/or a rotating magnetic or optical disk. The device or machine-readable medium may be distributed when partitions of instructions have been separated into different machines, such as across an interconnection of computers or as different virtual machines.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

What is claimed is:

1. A wide port SAS (serial attached small computer system interface) apparatus, comprising:
    a task context controller to store a plurality of task contexts for an associated plurality of input/output (I/O), wherein each task context stores a current data offset for the associated I/O, and wherein each task context stored within the task context controller is accessible with reference to an associated task context index (TCI);
    a plurality of transport engines each coupled to the task context controller and each coupled to process frames received only from a single one of a corresponding plurality of lanes of the wide port apparatus; and
    a plurality of comparators each coupled to an associated one of the transport engines,
    wherein each of the comparators is coupled to compare a received data offset from a receive frame with a fetched current data offset fetched from the task context controller and a result is used to determine frame processing order,
    wherein when a given transport engine is processing a frame from a given I/O, the task context controller locks the associated task context and denies other transport engines access to the associated task context.

2. The wide port SAS apparatus of claim 1, further comprising:
    a task context fetch unit coupled to the task context controller; and
    a control unit coupled to the task context fetch unit.

3. The wide port SAS apparatus of claim 2, further comprising:
    a plurality of counters coupled to the control unit.

4. The wide port SAS apparatus of claim 3, wherein the plurality of counters comprises:
    an on-hold timeout counter; and
    a task context retry counter.

5. The wide port SAS apparatus of claim 1, wherein each of the transport engines comprises:
    a task context fetch unit;
    an on-hold timeout counter;
    a task context retry counter; and
    a transport engine control unit,
    wherein one of the comparators is disposed within each of the transport engines.

6. The wide port SAS apparatus of claim 1, further comprising:
    a frame handling unit coupled to the task context controller, the frame handling unit including:
        a task context fetch unit; and
        a controller unit coupled to the task context fetch unit,
    wherein the comparators are disposed within the frame handling unit.

7. A serial attached small computer system interface (SAS) device comprising:
    a wide port device including a plurality of transport engines each for receiving and processing frames from only a single one of a corresponding plurality of lanes;
    a task context controller to store task contexts for an associated plurality of input/output (I/O), wherein each task context stores a current data offset for the associate I/O, and wherein each task context stored within the task context controller is accessible with reference to an associated task context index (TCI);
    a task context fetch unit coupled to the wide port device and to the task context controller to fetch the current data offsets from the task contexts stored within the task context controller by issuing TCIs to the task context controller;
    a plurality of comparators each associated with one of the transport engines and coupled to compare the current data offsets fetched from the task context controller to received data offsets received at the transport engines; and
    a control unit coupled to the comparators and the transport engines, the control unit to issue commands to the transport engines controlling processing order of the frames based on comparison results from the comparators,
    wherein when a given transport engine is processing a frame from a given I/O, the task context controller locks the associated task context and denies other transport engines access to the associated task context.

8. The SAS device of claim 7, wherein each of the plurality of transport engines includes:
    a timeout counter; and
    a retry counter.

9. A method for processing frames received over multiple lanes of a wide port SAS (serial attached small computer systems interface), the method comprising:
    storing a plurality of task contexts for an associated plurality of input/output within a task context storage, wherein each task context stores a current data offset for the associated I/O, wherein each task context stored within the task context storage is accessible with reference to an associated task context index (TCI);
    receiving a first data offset value from the task context storage by referencing one of the TCI, wherein the first data offset value comprises one of the current data offset value fetched from one of the task contexts;
    receiving a second data offset value, wherein the second data offset value is from a receive frame buffer;
    comparing the first data offset value with the second data offset value to determine whether the first data offset value either matches the second data offset value, is greater than the second data offset value, or less than the second data offset value, wherein the comparing is performed within a first transport engine of the wide port SAS;

locking the task context associated with the first data offset value while the first transport engine processes a frame associated with the task context and denying other transport engines within the wide port SAS from accessing the task context while the task context is locked;

performing a first operation in response to the first data offset value matching the second data offset value, wherein the first operation includes starting processing of a frame;

performing a second operation, different from the first operation, in response to the first data offset value being greater than the second data offset value; and performing a third operation, different from the first and second operations, in response to the first data offset value being less than the second data offset value.

10. The method of claim 9, wherein second operation comprises:

starting a first counter and incrementing a second counter.

11. The method of claim 9, wherein the third operation comprises:

executing retry logic.

12. The method of claim 9, wherein the third operation comprises:

executing error recovery logic if the first data offset value is less than the second data offset value.

13. The method of claim 9, further comprising:

transmitting an error signal if a counter exceeds a predetermined value; and performing error recovery logic.

14. The method of claim 9, wherein second operation comprises:

declining a processing request and transmitting a signal to unlock a locked context.

15. The method of claim 9, wherein the third operation comprises:

transmitting a grant signal to a request for processing and performing retry routine if transport layer retry conditions are met.

16. The method of claim 15, wherein the third operation comprises:

unlocking a locked task context.

17. The method of claim 9, wherein the third operation comprises:

performing error recovery logic if transport layer retry conditions are not met.

18. The method of claim 17, wherein the third operation further comprises:

unlocking a locked task context.

19. The method of claim 9, wherein the first operation further comprises:

unlocking a locked task context if the first data offset value matches the second data offset value.

* * * * *